(12) United States Patent
Hjordt et al.

(10) Patent No.: US 11,851,226 B2
(45) Date of Patent: Dec. 26, 2023

(54) DEVICE FOR SEALING THREE-DIMENSIONAL OBJECTS IN THE BAG OPENING OF A FILM BAG

(71) Applicant: Harro Höfliger Verpackungsmaschinen GmbH, Allmersbach im Tal (DE)

(72) Inventors: Nico Hjordt, Backnang (DE); Daniel Birkhold, Weinstadt (DE); Timo Graf, Berglen (DE)

(73) Assignee: Harro Höfliger Verpackungsmaschinen GmbH, Allmersbach im Tal (DE)

( * ) Notice: Subject to any disclaimer, the term of this patent is extended or adjusted under 35 U.S.C. 154(b) by 0 days.

(21) Appl. No.: 18/057,251

(22) Filed: Nov. 21, 2022

(65) Prior Publication Data

US 2023/0159204 A1 May 25, 2023

(30) Foreign Application Priority Data

Nov. 22, 2021 (EP) ..................................... 21209486

(51) Int. Cl.
*B65B 51/14* (2006.01)

(52) U.S. Cl.
CPC .................................. *B65B 51/146* (2013.01)

(58) Field of Classification Search
CPC ....... B65B 61/186; B65B 51/146; B65B 9/12; B65B 7/06; B29C 66/849; B29C 66/8491; B29C 66/43121
USPC .......... 53/410, 133.2, 481, 373.6; 156/583.1
See application file for complete search history.

(56) References Cited

U.S. PATENT DOCUMENTS

| | | | | |
|---|---|---|---|---|
| 2,751,732 A * | 6/1956 | Woppman | ............. | B29C 66/849 53/554 |
| 4,081,942 A * | 4/1978 | Johnson | ................ | B65B 31/046 53/511 |
| 4,534,159 A * | 8/1985 | Kelly | ...................... | B29C 65/02 53/552 |
| 4,768,330 A * | 9/1988 | Lane, Jr. | ................ | B29C 66/432 53/374.6 |
| 4,869,048 A * | 9/1989 | Boeckmann | .......... | B65B 9/2028 53/481 |
| 2008/0041023 A1* | 2/2008 | Tsuruta | ............... | B29C 66/0342 53/548 |
| 2018/0086528 A1* | 3/2018 | Ma | .................... | B29C 66/73921 |

FOREIGN PATENT DOCUMENTS

| | | |
|---|---|---|
| JP | H04367405 | * 12/1992 |
| WO | 9959876 A2 | 11/1999 |

* cited by examiner

*Primary Examiner* — Stephen F. Gerrity
*Assistant Examiner* — Linda J Hodge
(74) *Attorney, Agent, or Firm* — Smartpat PLC

(57) ABSTRACT

A device (10) for sealing three-dimensional objects (16) in the bag opening (14) of a film bag (12) comprises a clamp (36, 38) for the film bag (12), which has a pair of clamping shoes (42, 44) on each side, between which the edge of the film bag (12) is held. A heat sealer (26, 28) is provided for sealing the three-dimensional object (16) in the bag opening (14) of the film bag (12), wherein the heat sealer (26, 28) has a pair of sealing jaws (26, 28) between which the bag opening (14) of the film bag (12) can be sealed. The two clamping shoe pairs (42, 44) of the clamp (36, 38) are moved apart from one another during the sealing process.

17 Claims, 2 Drawing Sheets

DEVICE FOR SEALING THREE-DIMENSIONAL OBJECTS IN THE BAG OPENING OF A FILM BAG

CROSS-REFERENCE TO RELATED APPLICATION

This application claims the benefit of European Patent Application No. 21 209 486.6, filed 22 Nov. 2021, the contents of which is incorporated by reference in its entirety.

TECHNICAL FIELD

The invention concerns a device and a method for sealing three-dimensional objects in the bag opening of a film bag. Film bags are flexible containers which usually consist of a polymer film. Such film bags may be used for example for packaging or temporary storage of foodstuffs or pharmaceutical products.

BACKGROUND

Film bags are usually rectangular and have a bag opening on one side. A three-dimensional object is to be sealed in this bag opening, closing the bag opening. The three-dimensional object may be either a flexible object or a rigid object. In this way, for example, foodstuff packagings for fruit purée may be produced, as consumed in particular by young children. A rigid sucking nozzle is sealed into such film bags, via which the child can directly suck the fruit purée out of the film bag. Comparable drinking nozzles are also used in some beverage packagings and are also sealed in the film bag. The drinking or sucking nozzles may be provided with a closure element so that the corresponding film bag can also be closed again. Other areas of application are in principle possible, in particular in the foodstuffs sector and in the pharmaceutical sector.

The film bags may be taken ready-made from a stack. Alternatively, the film bags may be produced in an upstream workstation by folding a material web and subsequently welding this web longitudinally and transversely. The double-layer material web produced by folding is open at its upper edge, and can be separated after application, in portions, of the vertical weld seams and lower horizontal weld seams between the vertical weld seams. This gives individual film bags which are not yet closed at the top.

Before the three-dimensional object can be sealed in the bag opening, firstly the upper free edges of the bag opening must be pulled apart from one another. If the bag is not correctly opened, the object to be sealed inside cannot be positioned precisely. This may lead to leaking of the film bag.

Cyclic flat-bag machines are known, by means of which flat bags are filled with a flat product and then sealed. Here, usually, the flat bag is opened in two working processes. In a first workstation, the bag is picked up by side grippers and transported by means of these grippers to a second workstation. These grippers each clamp one of the two mutually opposing side edges of the bag. In the second workstation, the bags are opened by the two upper bag edges being drawn apart by a respective sucker acting from the outside. Since the upper bag edges move apart from one another during this movement, the side edges of the respective bag must accordingly move towards one another. Consequently, the two grippers must also move towards one another. The outward movement of the suckers must therefore be coordinated with the inward movement of the grippers. This requires a significant control complexity. Because of different bag sizes, this control setup must also be variable in order to allow corresponding adaptations.

DE 295 02 128 U1 discloses a flat-bag machine in which the bags are opened during transport from one workstation to the other. In this way, at least one workstation may be omitted. Under comparable conditions, this allows provision of an additional workstation, for example for filling the bags. Thus, several filling stations may be arranged in succession so that the filling product can be composed from several mixing components. The bags may be opened during transport here as the mutual spacing of the two side grippers become smaller, the greater the distance travelled from the first workstation. This may be achieved for example by guides for the grippers which are arranged in a V-shape relative to one another.

During sealing of the open bag edge and sealing of three-dimensional object, the bag edge must then be pulled outward again as far as possible so that no folds or channels occur in the sealing seam during the sealing process. Such folds or channels in the sealing seam would cause leaks in the finished bag. The open bag edges are usually tensioned in a separate workstation. This often leads to difficulties in processing small bags.

SUMMARY

The disclosure provides an improved device for sealing three-dimensional objects in the bag opening of a film bag, which allows as precise a sealing seam as possible around the three-dimensional object.

The device for sealing three-dimensional objects in the bag opening of a film bag and a method for sealing three-dimensional objects in the bag opening of the film bag are described.

The device for sealing three-dimensional objects in the bag opening of a film bag has a clamp for the film bag, and a heat sealer for sealing a three-dimensional object in the bag opening of the film bag. The clamp has a pair of clamping shoes on each side, between which the edge of the film bag is held. The heat sealer has a pair of sealing jaws between which the bag opening of the film bag can be sealed. The two clamping shoe pairs of the clamp can be moved apart from one another so that the bag opening can be pulled outward and hence tensioned around the object to be sealed. Such a tensioned bag opening allows a clean and precise sealing seam. No folds or channels can be formed in the sealing seam, so no leaks of the film bag can occur.

Preferably, the clamping shoes may each be attached to a spring, in particular a bending spring. Such a spring is shaped such that, on movement of the sealing jaws towards one another, a superposed movement of the springs away from one another can take place. On closing of the two sealing jaws, the clamping shoes meet the outer edges of the film bag shortly before the two sealing jaws meet, and clamp said outer edge between them. On further closing of the sealing jaws, the outer edges are pulled outward by the clamping shoes so that the bag opening is held under tension. This pulling apart ensures a smooth bag opening even when a three-dimensional object is to be sealed. This allows a smooth seal without folds and channels.

Because of the device for sealing three-dimensional objects in the bag opening of a film bag, no separate station for spreading the bag opening is required. Rather, the complex function of spreading the bag opening can be integrated in a structurally simple component which can easily be adapted to different requirements. Thanks to the compact design of the clamp and the arrangement very close to the sealing jaws, even small bags can be spread rapidly and reproducibly.

Preferably, the clamping shoes may be mounted on the respective springs by means of a hinge joint. The contact faces of a clamping shoe pair may thereby always be arranged parallel to the film bag in every position of the springs.

In principle, the contact face of the clamping shoes may be configured with an arbitrary surface, for example also with a smooth surface. At least one of the two clamping shoes of a clamping shoe pair may preferably have a profiled contact face.

Each contact face of the two clamping shoe pairs may preferably protrude slightly beyond the sealing jaws. In this way, the clamping shoes can grip the edges of film bag and pull these apart in good time before contact with the sealing jaws.

The clamping shoes may each be guided in a slotted opening. This allows a simple and secure guidance which can be achieved without great structural complexity.

In a particularly advantageous embodiment, the heat sealer together with the clamp is attached to a pair of guide elements. Movement of the clamp is thereby integrated in the closing movement of the heat sealer. In this way, no additional actuators are required so a very compact construction can be achieved.

In an advantageous embodiment, the device for sealing three-dimensional objects in the bag opening of a film bag may have a pair of clamping jaws. In this case, the clamping jaw pair is arranged ahead of the sealing jaws. The three-dimensional object to be sealed in the bag opening of a film bag can firstly be compressed by the clamping jaws and thus collapsed before the actual sealing of the flat bag. Such an embodiment is therefore advantageous in particular in the case of flexible valves, while the clamping jaw pair may be omitted for non-flexible valves. Preferably, the clamping jaw pair may be spring-mounted so that the three-dimensional object cannot be accidentally damaged.

In principle, the shape of the film bag may be made variable. Thus, even irregularly shaped film bags can be processed with device.

Further advantages and features of the invention are given in the claims and in the exemplary embodiment below.

BRIEF DESCRIPTION OF THE DRAWINGS

The invention is described and explained in more detail below with reference to the exemplary embodiment shown in the drawings. In the drawings.

DETAILED DESCRIPTION

Figure 1:
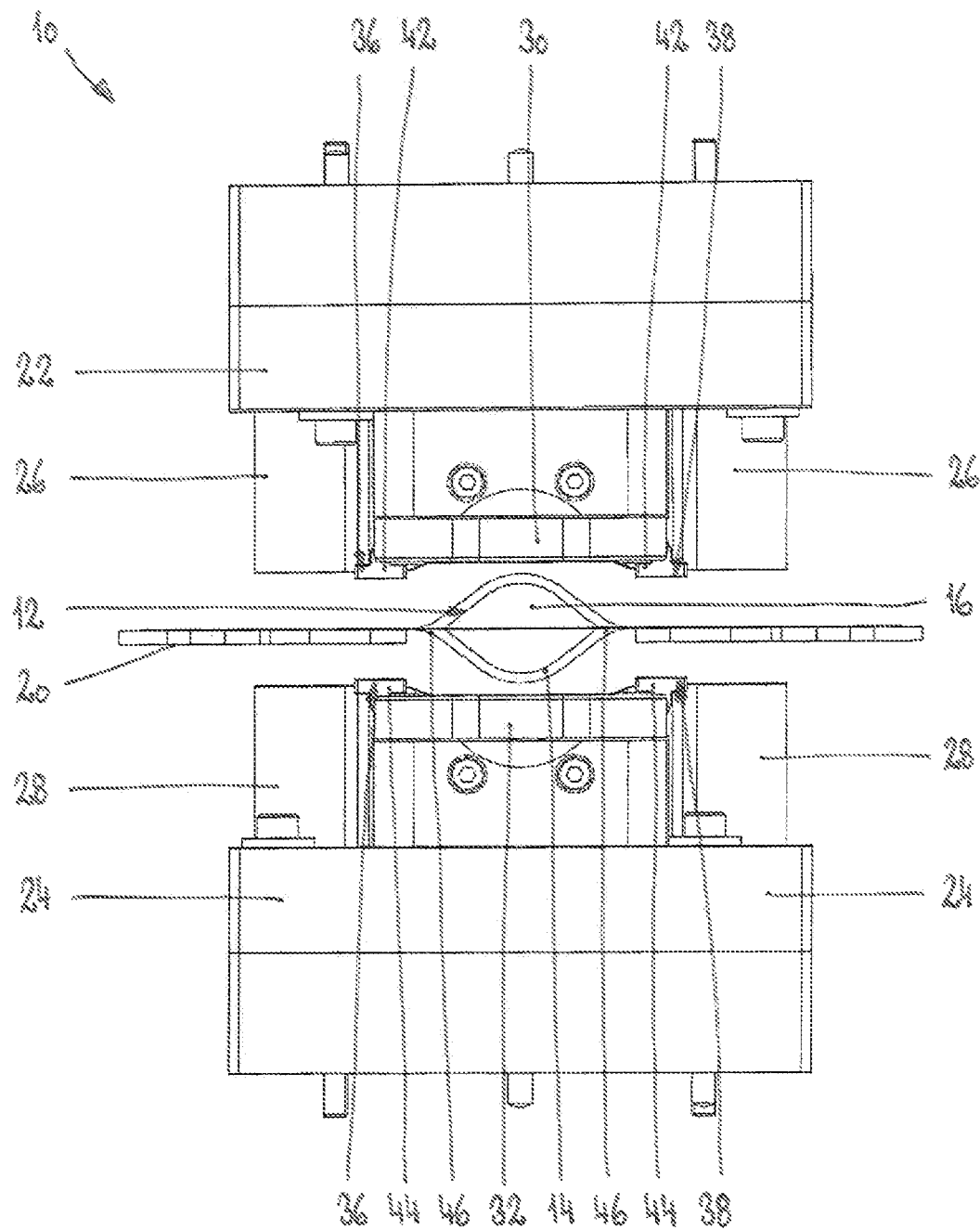
FIG. 1 shows a side view of a device for sealing three-dimensional objects in the bag opening of a film bag before closing of the sealing jaws.
Figure 2:
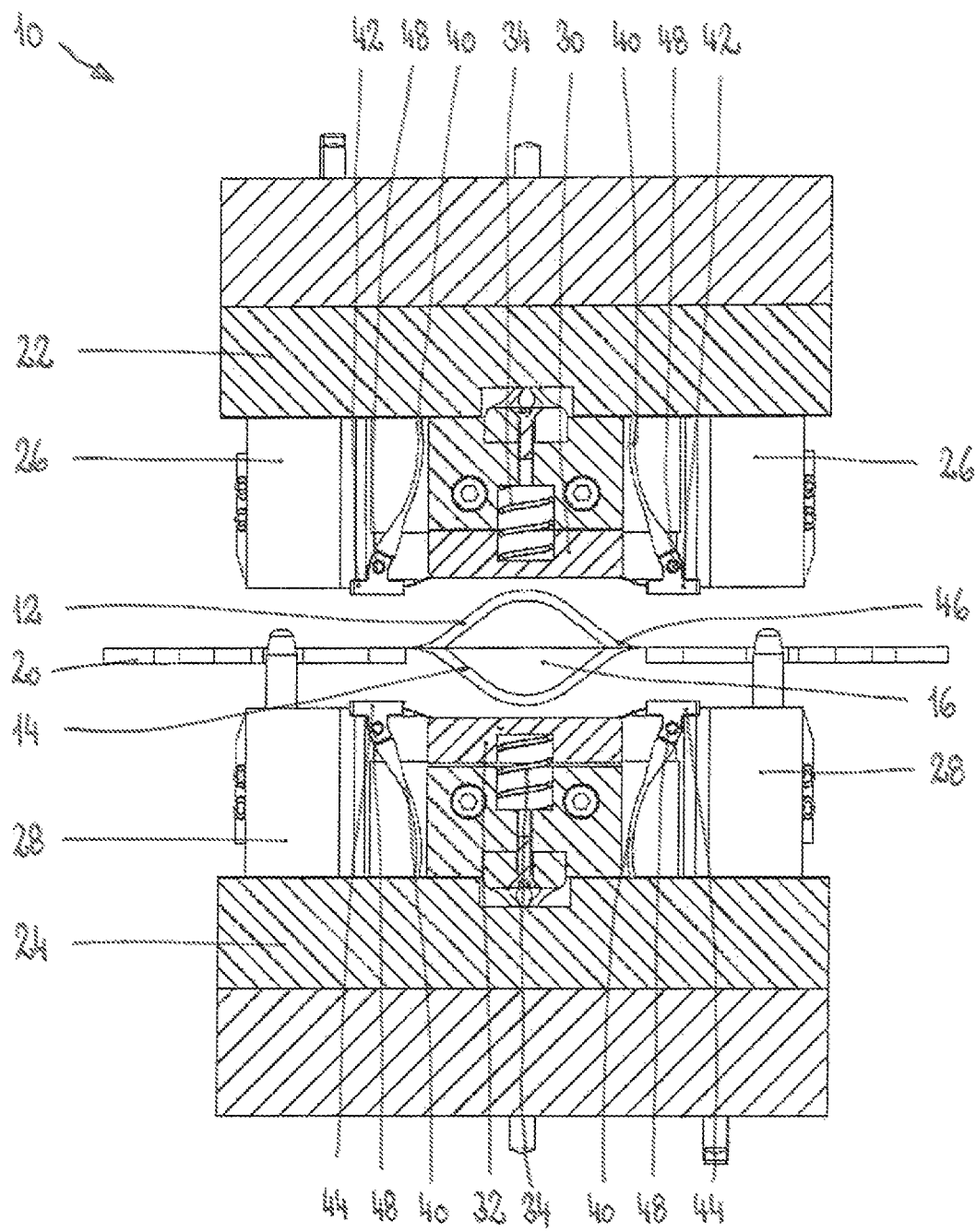
FIG. 2 shows a cross-section through the device for sealing three-dimensional objects in the bag opening of a film bag according to FIG. 1.

The device 10 for sealing three-dimensional objects in the bag opening of a film bag is designed in the present example such that the pre-sealed film bags 12 are sealed lying down with a bag opening 14 on one side. In contrast, it would also be possible to transport and seal the film bags 20 in the standing or hanging position.

The pre-sealed film bag 12 is opened in an upstream processing device (not shown here). A three-dimensional object has been placed in the bag opening. The film bag 12 prepared in this way is supplied to the device 10 lying on a support plate 20. A respective guide element 22, 24 is present above and below the support plate 20. The guide elements 22, 24 may be moved towards one another in a vertical movement by a drive unit (not shown here). An upper sealing jaw 26 is attached to the upper guide element 22, while a lower sealing jaw 28 is attached to the lower guide element 24. On movement of the guide elements 22, 24 towards one another, the sealing jaws 26, 28 thus also move towards one another. The bag opening 14 of the film bag 12 may be sealed by the two sealing jaws 26, 28 in the region of the support plate 20. During this sealing of the bag opening 14, the three-dimensional object 16 is sealed into the bag opening 14.

A clamping jaw 30, 32 is spring-mounted on each guide element 22, 24. The clamping jaws 30, 32 are here arranged in the region of the film bag 12 just below the bag opening 14, so that the clamping jaws 30, 32 do not obstruct the sealing jaws 26, 28. The clamping jaws 30, 32 are also moved on a movement of the guide elements 22, 24. The clamping jaws 30, 32 are however offset slightly towards the rear relative to the sealing jaws 26, 28. When the guide elements 22, 24 are moved towards one another, the three-dimensional object 16 is initially compressed by the two clamping jaws 30, 32 in the region of the bag opening 14 of the film bag 12. Thus, in the case of a flexible three-dimensional object 16, a flat seal becomes possible. The two clamping jaws 30, 32 are each mounted on the guide elements 22, 24 via a spring 34. Because of the springs 34, the clamping jaws 30, 32 can move such that the two sealing jaws 26, 28 can lie against one another and the sealing process can be started. If the three-dimensional object 16 is a non-flexible object, the clamping jaws 30, 32 may also be omitted.

In the present example, a left clamp 36 and a right clamp 38 are attached to the guide elements 22, 24 directly next to the clamping jaws 30, 32. Each clamp 36, 38 has a bending spring 40 which is attached by its outer end to the guide element 22, 24. The clamps 36, 38 are thus also moved by the guide elements 22, 24 so no separate drive is required for the clamps 36, 38. A clamping shoe 42, 44 is attached at the inner end of each spring 40. Thus, in each case an upper clamping shoe 42 and a lower clamping shoe 44 form a clamping shoe pair of a clamp 36, 38. Before the sealing jaws 26, 28 meet one another, an upper clamping shoe 42 and a lower clamping shoe 44 grip the side edge region 46 of the film bag 12 and clamp this. On further inward movement of the two sealing jaws 26, 28, the bending springs 40 generate a superposed horizontal movement via which the two edge regions 46 of the film bag 12 are pulled outward. Thus, the bag opening 14 is pulled outward before the actual sealing process, and tensioned around the three-dimensional object 16. In this way, no folds or channels can occur in the sealing seam.

The clamping shoes 42, 44 each protrude slightly beyond the two sealing jaws 26, 28. In this way, it can be guaranteed that the clamping shoes 42, 44 pull the bag edges 46 outward before the sealing seam is applied.

So that the contact faces of the clamping shoes 42, 44 always lie parallel to one another—and hence also parallel to the film bag 12—irrespective of their position, in the present example the clamping shoes 42, 44 are each attached to the bending spring 40 via a hinge joint 48.

What is claimed is:

1. A device (10) for sealing a three-dimensional object (16) in a bag opening (14) of a film bag (12), comprising:

a first guide element (22);
a second guide element (24);
a clamp (36, 38) for the film bag (12) with two clamping shoe pairs (42, 44) between which an edge of the film bag (12) can be held, one pair of clamping shoes (42, 44) being arranged on each side of the bag opening (14); and
a heat sealer (26, 28) for sealing a three-dimensional object (16) in the bag opening (14) of the film bag (12),
wherein the heat sealer (26, 28) has a pair of sealing jaws (26, 28) between which the bag opening (14) of the film bag (12) can be sealed,
wherein the pair of sealing jaws (26, 28) includes
a first sealing jaw (26) attached to the first guide element (22), and
a second sealing jaw (28) attached to the second guide element (24),
wherein the two clamping shoe pairs (42, 44) include
two first clamping shoes (42) spring-mounted on the first guide element (22), and
two second clamping shoes (44) spring-mounted on the second guide element (24), and
wherein the two clamping shoe pairs (42, 44) of the clamp (36, 38) can be moved apart from one another by moving the first guide element (22) away from the second guide element (24).

2. The device according to claim 1,
wherein the clamping shoes (42, 44) are each attached to a spring (40),
wherein each respective spring (40) includes a proximal end connected to the respective clamping shoe (42, 44) and a distal end supported on the respective guide element (22, 24).

3. The device according to claim 2,
wherein each respective spring (40) is a bending spring (40) having an outwardly curved body.

4. The device according to claim 2,
wherein the clamping shoes (42, 44) are each mounted on the respective spring (40) by a hinge joint (48).

5. The device according to claim 1,
wherein at least one of the two clamping shoes (42, 44) of each of the two clamping shoe pairs (42, 44) has a profiled contact face.

6. The device according to claim 1,
wherein each pair of clamping shoes (42, 44) comprises two contact faces arranged opposite one another on opposite sides of the film bag (12), and
wherein each contact face of the two clamping shoe pairs (42, 44) protrudes slightly beyond the sealing jaws (26, 28).

7. The device according to claim 1,
wherein each pair of clamping shoes (42, 44) comprises two clamping shoes (42, 44), each of the two clamping shoes (42, 44) being guided in a respective slotted opening.

8. The device according to claim 1,
wherein the two clamping shoe pairs (42, 44) are arranged directly above two sealing jaws (26, 28).

9. The device according to claim 1,
wherein the heat sealer (26, 28) together with the clamp (36, 38) is attached to the first and second guide elements (22, 24).

10. The device according to claim 1,
further comprising a pair of clamping jaws (30, 32) which is arranged to compress and collapse the three-dimensional object (16) ahead of the sealing jaws (26, 28) sealing the three-dimensional object in the film bag (12).

11. The device according to claim 10,
wherein the pair of clamping jaws (30, 32) is spring-mounted,
a first clamping jaw (30) of the pair of clamping jaws (30, 32) being spring mounted to the first guide element (22) and
a second clamping jaw (32) of the pair of clamping jaws (30, 32) being spring mounted to the second guide element (24).

12. A method for sealing three-dimensional objects (16) in a bag opening (14) of a film bag (12), comprising:
opening the bag opening (14) of the film bag (12) upstream of a sealing device (10), and placing a three-dimensional object (16) in a region of the bag opening (14);
arranging the bag opening (14) with the three-dimensional object (16) therein between a first guide element (22) and a second guide element (24) of the sealing device (10); and
sealing the bag opening (14) of the film bag (12) by moving the first guide element (22) towards the second guide element (24),
wherein movement of the first guide element (22) towards the second guide element (24) initially causes each of two edges (46) of the film bag (12) to be held by a clamping shoe pair (42, 44) and the two edges (46) to be pulled apart from one another; and
wherein further movement of the first guide element (22) towards the second guide element (24) causes a heat sealer (26, 28) to contact the film bag (12) and seal the three-dimensional object (16) in the bag opening (14).

13. The method according to claim 12,
wherein sealing of the bag opening (14) is performed during pulling the two edges of the film bag (12) apart.

14. The method according to claim 12, further comprising partially collapsing the film bag (12) before sealing of the bag opening (14).

15. The method according to claim 14,
wherein partially collapsing the film bag (12) is performed by a clamping jaw pair (30, 32).

16. The method according to claim 14,
partially collapsing the film bag (12) is performed while pulling the edges (46) of the film bag (12) apart.

17. A device (10) for sealing a three-dimensional object (16) in a bag opening (14) of a film bag (12), comprising:
a support plate (20) for supporting the film bag (12) thereon;
an upper guide element (22) arranged above the support plate (20), the upper guide element (22) being configured to move downwardly towards the film bag (12) and upwardly away from the film bag (12);
a lower guide element (24) arranged below the support plate (20), the lower guide element being configured to move upwardly towards the film bag (12) and downwardly away from the film bag (12);
a left clamp (36) including a left clamping shoe pair (42, 44) for holding a left edge of the film bag (20), the left clamping shoe pair (42, 44) including
an upper left clamping shoe (42) spring-mounted on the upper guide element (22), and
a lower left clamping shoe (44) spring-mounted on the lower guide element (24);

a right clamp (38) including a right clamping shoe pair (42, 44) for holding a right edge of the film bag (20), the right clamping shoe pair (42, 44) including
an upper right clamping shoe (42) spring-mounted on the upper guide element (22), and
a lower right clamping shoe (44) spring-mounted on the lower guide element (24); and
a heat sealer (26, 28) for sealing the three-dimensional object (16) in the bag opening (14) of the film bag (12), the heat sealer (26, 28) having
an upper sealing jaw (26) attached to the upper guide element (22), and
a lower sealing jaw (28) attached to the lower guide element (24).

\* \* \* \* \*